US006698472B2

(12) United States Patent
Camacho et al.

(10) Patent No.: US 6,698,472 B2
(45) Date of Patent: Mar. 2, 2004

(54) HOUSING FOR A FLUID TRANSFER MACHINE AND METHODS OF USE

(75) Inventors: Michael J. Camacho, Rancho Cucamonga, CA (US); Eric A. Berg, Tarzana, CA (US)

(73) Assignee: MOC Products Company, Inc., Pacoima, CA (US)

(*) Notice: Subject to any disclaimer, the term of this patent is extended or adjusted under 35 U.S.C. 154(b) by 93 days.

(21) Appl. No.: 10/059,868

(22) Filed: Jan. 29, 2002

(65) Prior Publication Data

US 2002/0113098 A1 Aug. 22, 2002

Related U.S. Application Data

(60) Provisional application No. 60/266,399, filed on Feb. 2, 2001.

(51) Int. Cl.[7] .................................................. F16C 3/14

(52) U.S. Cl. ........................... 141/231; 141/59; 141/65; 141/98; 184/1.5

(58) Field of Search .............................. 141/65, 67, 59, 141/98, 231, 285, 8; 184/1.5

(56) References Cited

U.S. PATENT DOCUMENTS 2,603,312 A * 7/1952 Tabet ......................... 184/1.5
4,782,689 A 11/1988 De Rome
4,888,980 A 12/1989 De Rome
5,242,032 A * 9/1993 Prestwood et al. .......... 184/1.5
5,318,700 A 6/1994 Dixon et al.
5,370,160 A 12/1994 Parker
5,472,064 A 12/1995 Viken
5,573,045 A 11/1996 Akazawa
5,615,716 A 4/1997 Akazawa
5,806,629 A 9/1998 Dixon et al.
5,853,068 A 12/1998 Dixon et al.
6,112,855 A 9/2000 Camacho et al.
6,131,701 A 10/2000 Camacho et al.
6,135,136 A 10/2000 Klamm
6,152,193 A 11/2000 Klamm
6,161,566 A 12/2000 Klamm
6,165,567 A 12/2000 Ventzek et al.
6,206,055 B1 * 3/2001 Hollub et al. ................. 141/98
6,213,175 B1 4/2001 Rome et al.

* cited by examiner

*Primary Examiner*—Gregory L. Huson
*Assistant Examiner*—Peter deVore
(74) *Attorney, Agent, or Firm*—John J. Connors; Connors & Assoc., Inc.

(57) ABSTRACT

A housing for a fluid transfer machine includes a base and a pedestal extending outward from the base in a substantially vertical orientation and terminating in a platform. The base has a perimeter defined by an edge, and the pedestal is offset inward from the edge to provide an open space beneath the platform between an underside of the platform and a topside of the base member. This space stores at least one container for a fluid. A cover is mounted to move between an open position where the platform is exposed and a closed position where the platform is covered.

41 Claims, 12 Drawing Sheets

FIG. 13
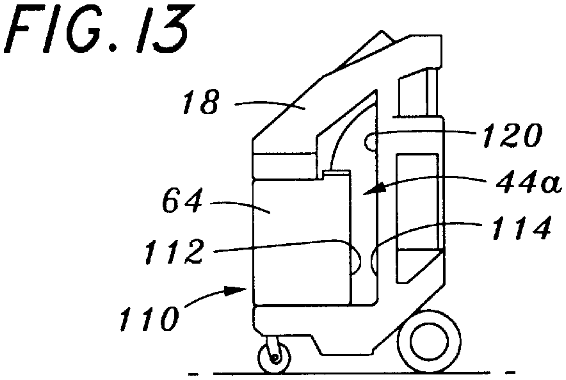
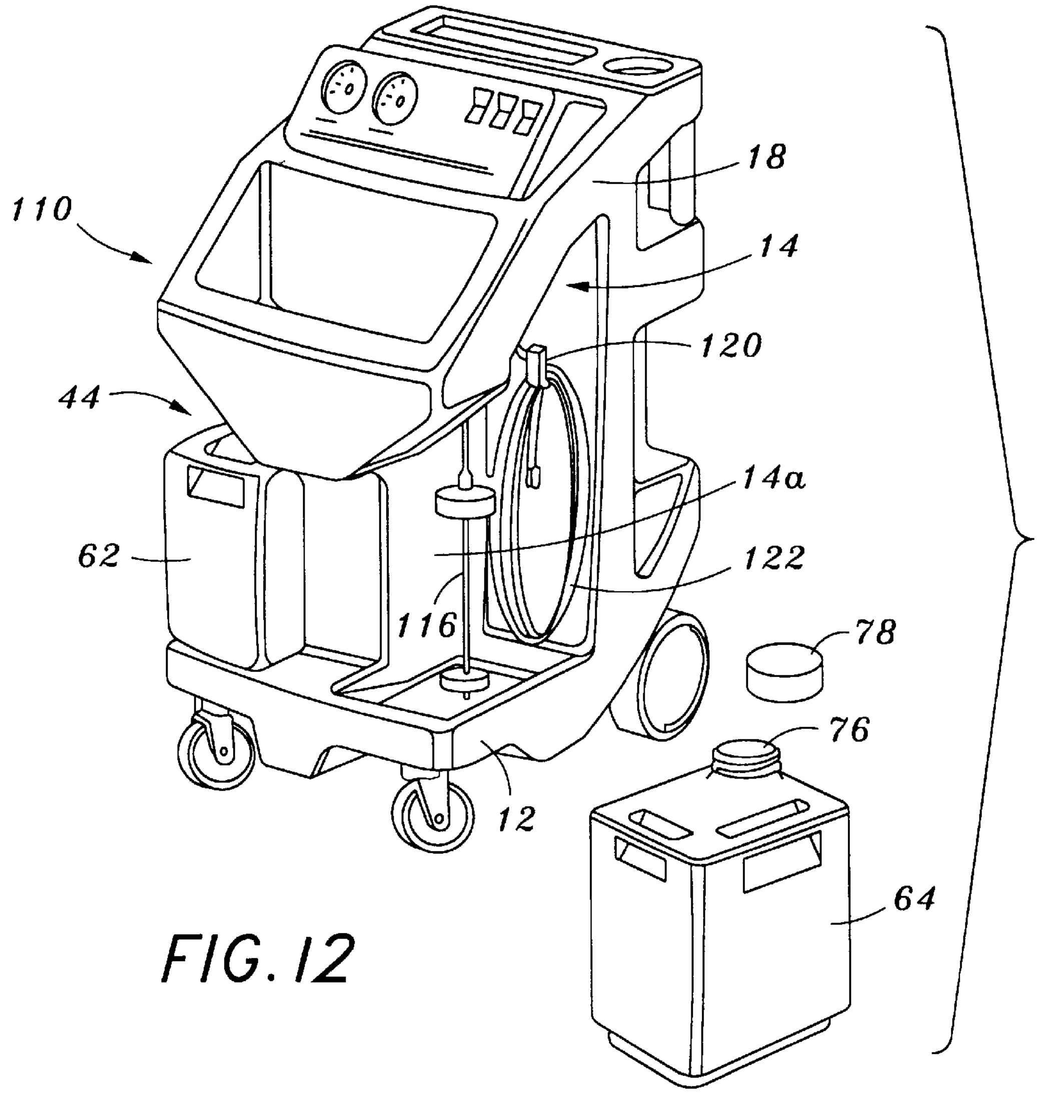
FIG. 12

HOUSING FOR A FLUID TRANSFER MACHINE AND METHODS OF USE

RELATED PATENT APPLICATIONS

This application is a utility application based on U.S. provisional patent application Serial No. 60/266,399, entitled "Housing For A Fluid Transfer Machine and Methods of Use," filed Feb. 2, 2001. This related application is incorporated herein by reference and made a part of this application.

BACKGROUND OF THE INVENTION

In the servicing of an automotive vehicle it is necessary to transfer such fluids as engine flush liquids, transmission fluid, radiator coolant, power steering fluid, and fuel injection cleaners. Typically, these different fluids have different colors, or are at least stored in color coded containers. For example, the engine flush liquid is blue and/or is stored in a blue container, the transmission fluid is red or black and/or is stored in a red or black container, the radiator coolant is green and/or is stored in a green container, the power steering fluid is yellow and/or is stored in a yellow container, and the fuel injection cleaner is green and/or is stored in a green container. In many situations there is an exchange of used and new fluids, but sometimes, for example, with the fuel injection cleaner, the same cleaner is recycled many times and there is not a replacement of a used fluid with a new fluid. When an exchange of fluids is required, two receptacles are employed, one for the new fluid and the other for the used fluid. Typical fluid transfer machines are illustrated in U.S. Pat. Nos. 5,472,064; 5,806,629; 5,853,068; 6,165,567; 6,112,855; and 6,131,701.

SUMMARY OF THE INVENTION

This invention has several features. These features provide this invention with its many desirable attributes. After reading the following section entitled "DETAILED DESCRIPTION OF THE PREFERRED EMBODIMENTS," one will understand how the features of this invention provide its benefits, which include, but are not limited to, convenient access to and replacement of containers for fluid, compactness for ease of storage, mobility, applicability to a variety of different types of automotive fluid transfer machines. Without limiting the scope of this invention as expressed by the claims that follow, its more prominent features will now be discussed briefly.

A first feature of the housing of this invention is that it is particularly suited for a fluid transfer machine used in the automotive service industry. It includes a base member having a perimeter defined by an edge. The base member holds one or more container of fluid that is manually move onto and from the base member. Preferably, there are wheel members extending from an underside of the base member. A pedestal member extends outward from the base member in a substantially vertical orientation and terminates in a platform. A cover member is mounted to the platform, for example, by a hinge, in a manner enable it to move between an open position where the platform is exposed and a closed position where the platform is covered. The platform may be substantially horizontally oriented or at an angle with respect to the horizontal. Preferably, the base member and the platform have substantially the same over all shape and dimensions. In one embodiment of this invention the base member and the platform are each rectangular. In some applications it is desirable to have the container and at least a part, or component of the housing, of substantially the same color.

A second feature is that the pedestal member is offset inward from a front edge portion of the base member to provide an open space beneath the platform between an underside of the platform and a topside of the base member. This space adapted to store at least one container for a fluid. There typically is at least one hose member in communication with a container in the space. This hose member extends from the underside of the platform and terminates in a connector adapted to attach and detach the hose member to the container. The configuration of the pedestal member is important. Preferably, the pedestal member has a hollow interior and has a removable door to provide access to this hollow interior. One side of the pedestal member is positioned nearby a rear edge portion of the edge of the edge of the base member. Opposite this one side is a substantially vertical partition wall that is centrally positioned on the base member and at substantially a right angle to a front edge portion of the base member.

A third feature is that space has a volume that is complementary to the shape and dimensions of the container. In one embodiment, the container occupies essentially the entire space when the container positioned on the base member. In another embodiment, the container has a predetermined height and a predetermined volume and the space has a height that is substantially the same as the predetermined height of the container and the space is greater in volume than the predetermined volume of the container, for example, up to a maximum of 15 volume percent greater than the predetermined volume of the container.

A fourth feature is that the base member and the space between the platform and base member are designed to accommodate different types of containers or pairs of containers. In one embodiment, the container is a single unit or structure having a central, longitudinal, narrow indentation on an inboard side thereof that receives the partition wall when the container is positioned on the base member. This indentation is only slightly greater in size than the partition wall, so the wall fits snugly within the indentation. In another embodiment, the base member supports a pair of containers that are side by side next to each other and the partition wall is between the containers. Preferably, the containers comprising this pair are preferably mirror images of each other. One, or both, containers may have an opening and a level sensing instrument inserted into this opening. Preferably, the container has a bottom with a predetermined configuration and the topside of the base member has a recess portion therein that is substantially identical to this predetermined configuration of the bottom of the container. This facilitates storing the container in the space. There is a predetermined distance between the underside of the platform and the topside of the base member, and the container has a height substantially the same as this predetermined distance, which typically is from about 24 to about 36 inches.

This invention also includes a method of transferring fluid between a container of fluid and an automotive vehicle. This method includes:

(a) providing a transfer machine having a housing, including
  - a base member having a perimeter defined by an edge,
  - a pedestal member extending outward from the base member in a substantially vertical orientation and terminating in platform, said pedestal member being offset inward from the edge of the base member to provide an open space beneath the platform between an underside of the platform and a topside of the base member for storing at least one container for a fluid, and a cover member mounted to enable the cover member to move between an open position where the platform is exposed and a closed position where the platform is covered;

(b) placing a container of fluid into the open space with said container being supported by the topside of the base member; and (c) placing the container and the automotive vehicle in communication with each other through the transfer machine to effect a transfer of the fluid in the container until substantially of the fluid is removed from the container and the container is empty.

The method of claim 34 may include the step of replacing with a new container of fluid the empty container. Also, a pair of containers may employed, one for new fluid and the other for used fluid. The housing, or a portion thereof, and the container may also have substantially the same color.

DESCRIPTION OF THE DRAWING

The preferred embodiments of this invention, illustrating all its features, will now be discussed in detail. These embodiments depict the novel and non-obvious housing of this invention for a fluid transfer machine and methods of use as shown in the accompanying drawing, which is for illustrative purposes only. This drawing includes the following figures (Figs.), with like numerals indicating like parts:

FIG. 12 is a perspective view of the fifth embodiment of the housing this invention for a fluid transfer machine looking at the front of the housing with one its containers placed in the storage space provided by the housing and the other of its containers removed from the storage space provided by the housing.

FIG. 13 is a side elevational view of the housing of FIG. 12 with both containers placed in the storage space provided by the housing.

DETAILED DESCRIPTION OF THE PREFERRED EMBODIMENTS

First Embodiment

Figure 1:
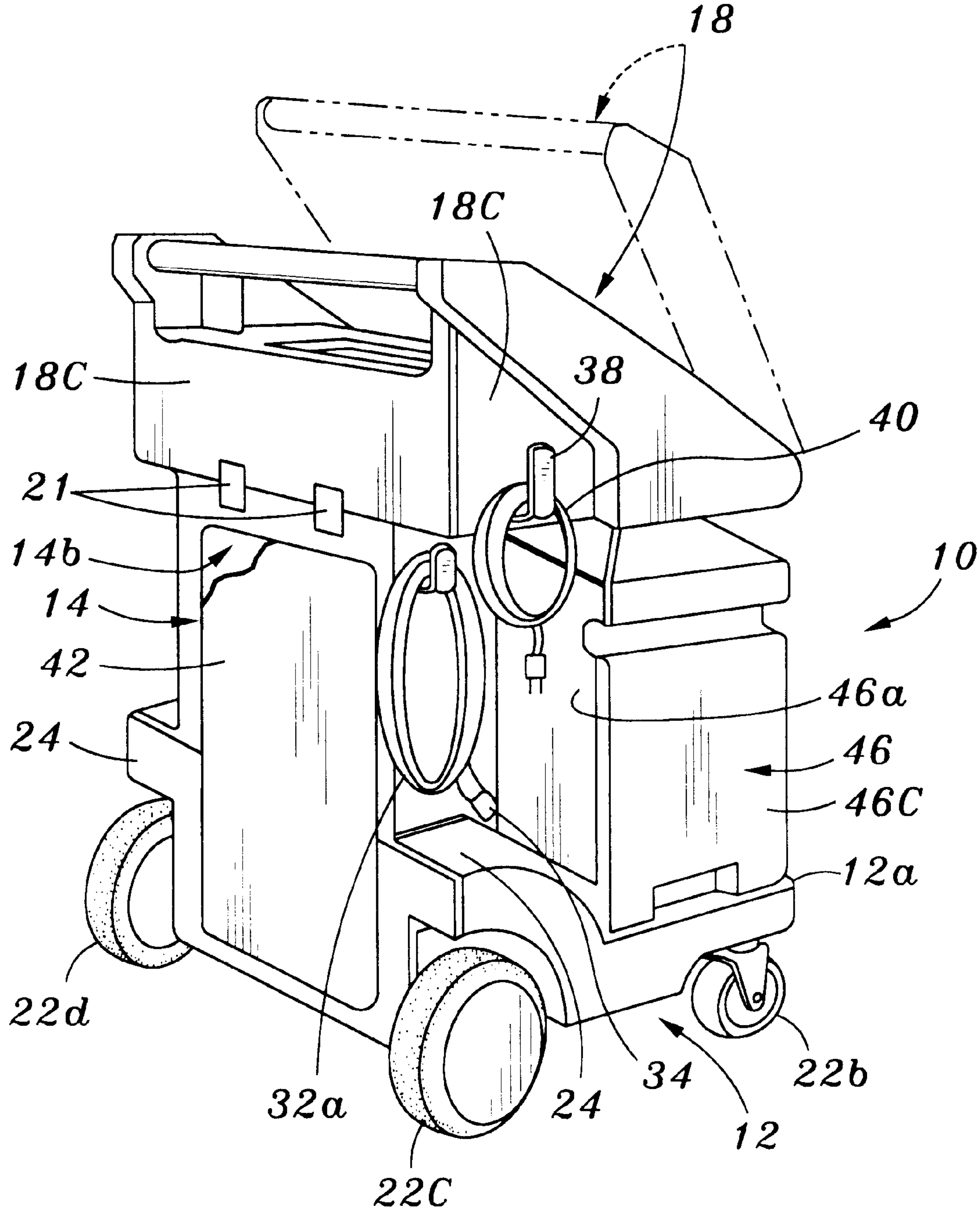
FIG. 1 is a perspective view of the first embodiment of the housing of this invention for a fluid transfer machine looking at the rear of the housing.
Figure 2:
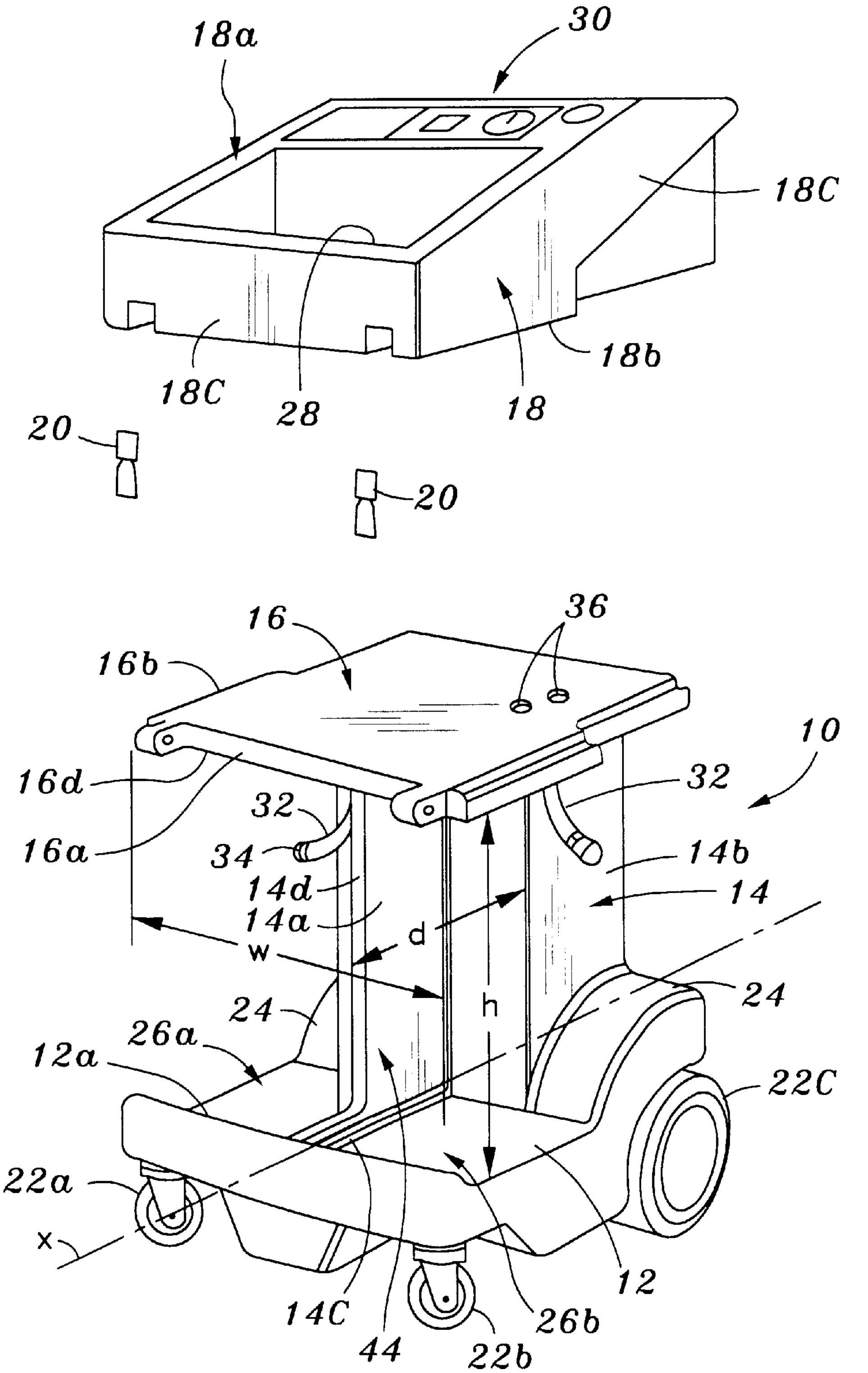
FIG. 2 is an exploded perspective of the housing shown in FIG. 1 looking at the front of the housing.
Figure 3:
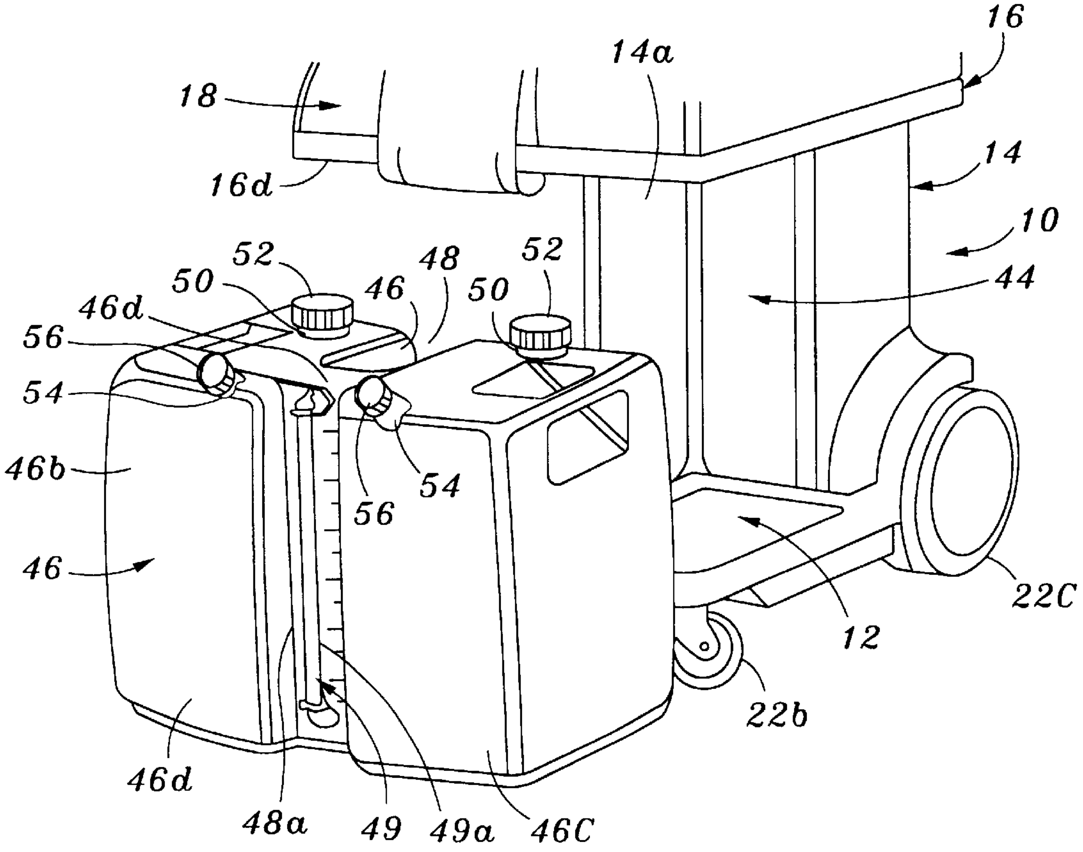
FIG. 3 is a perspective view of a unitary container that straddles a partition wall of the pedestal of the housing shown in FIG. 1.
Figure 4:
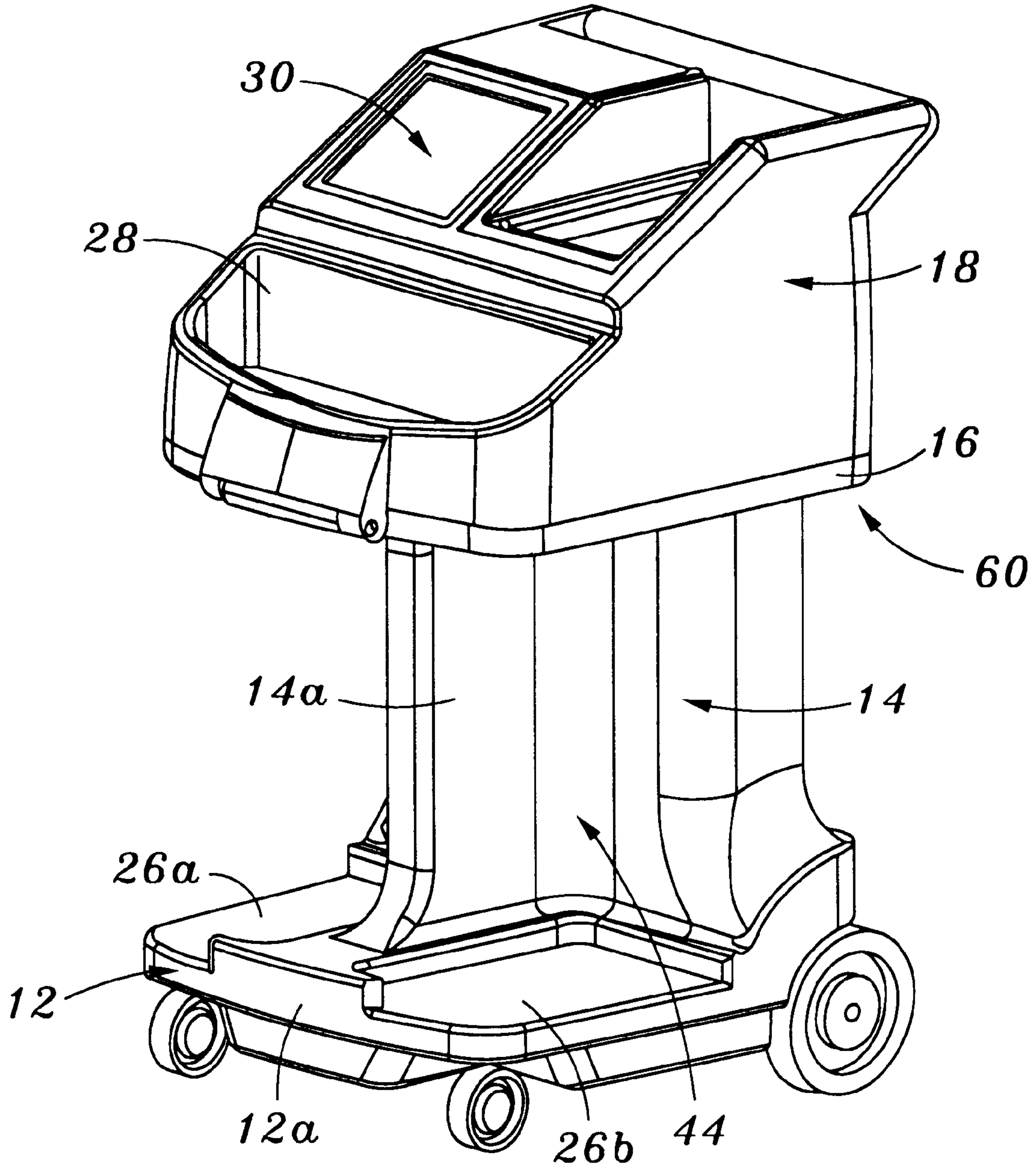
FIG. 4 is a perspective view of the second embodiment of the housing this invention for a fluid transfer machine looking at the front of the housing with its containers removed from the storage space provided by the housing.

As illustrated in FIGS. 1 through 3, the first embodiment of this invention, the housing 10, includes a rectangular base 12 and, centrally positioned on the base, a pedestal 14 that extends upward in a vertical orientation. As best shown in FIG. 2, fixedly attached to the top of the pedestal 14 is a flat, rectangular, planar platform 16 oriented horizontally. This platform 16 is used to support components of a fluid transfer machine (not shown). Indeed, the housing 10 may be consider a component of the automotive transfer machine, and an important feature of this invention is that the housing 10 is adapted to be used with a variety of different fluid transfer machines. For example, but not limited to, the housing 10 may be used with machines for transferring such fluids as engine flush liquids, transmission fluid, radiator coolant, power steering fluid, and fuel injection cleaners. Hoses 32 of the fluid transfer machine pass through holes 36 in the platform 16. Preferably, these hoses 32 terminate in quick disconnect connectors 34 for placing fluid in communication with the automotive vehicle being serviced.

A cover 18 is mounted by hinges 20 (FIG. 2) attached to an edge 16*a* of the platform 16. This cover 18 has a handle 19 and latches 21 that secure the cover to the platform 16. Upon unlatching the latches 21, a technician that operates the fluid transfer machine can manually move the cover 18 between a closed position shown in solid lines in FIG. 1, covering the platform 16, and an open position shown in dotted lines in FIG. 1, exposing the platform, and any of the components of the fluid transfer machine mounted thereon.

Preferably, the cover 18 has a front face 18*a* slanted inward, and mounted thereon, is a control panel 30 displaying any pressure gages, flow meters, indicator lights, switches, or other instrumentation (not shown) of the fluid transfer machine. Optionally, there is in the front face 18*a* a sunken tray 28 for holding tools or parts used by the technician. The lower perimeter 18*b* of the cover 18 has substantially the same shape and dimensions as the perimeter 16*b* of the platform 16. The cover 18 includes raised side walls 18*c* extending from the cover's lower perimeter 18*b* and terminating at the front face 18*a*. Thus, the cover 18 forms a moveable enclosure for any of the components of the fluid transfer machine mounted on the platform 16. A hook 38 is attached to one side wall 18*c* for holding, for example, a power cable 40. Another hook 38*a* may be attached to the pedestal 14 for holding, for example, another hose 32*a* with a connector 34 again for placing fluid in communication with the automotive vehicle being serviced.

The base 12 has a wheel member at each of its corners, with the front wheels 22*a* and 22*b* being caster types that swivel and the rear wheels 22*c* and 22*d* being mounted on axles (not shown) and each positioned beneath a fender 24. A pair of recesses 26*a* and 26*b* are formed by a vertical partition wall 14*a* of the pedestal 14 and a raised front edge 12*a* of the base 12. This partition wall 14*a* has its bottom edge 14*c* co-extensive with the center line X of the base 12 and is at a right angle to the base and is at a right angle the raised front edge 12*a*. The leading edge 14*d* of the partition wall 14*a* is set back from the front edge 12*a* of the base 12 a distance of from about 6 to about 8 inches. The partition wall 14*a* is the same height as the space and its thickness is of from about ¾ to about 1 ¼ inch. Its width is from about 2 to about 4 inches. The pedestal 14 preferably has a rear compartment 14*b* that is hollow and there is at the rear of the housing an access door 42 (FIG. 1) that is removable. This compartment 14*b* provides a storage area within the interior of the pedestal 14.

As best shown in FIGS. 2 and 3, a storage space 44 for a container 46 is created on each side of the partition wall 14*a* between the underside 16*d* of the platform 16 and the topside 12*d* of the base 12. The container 46 holds the fluid used by the fluid transfer machine. The space 44 has a volume that is complementary to the shape and dimensions of the container 46 so that the container, in this first embodiment of the invention, occupies essentially the entire space 44 when the container is seated on the base 12 as shown in FIG. 1. The dimensions of this space 44 and the container 46 are substantially the same, and typically each have a width w of from about 30 to about 40 inches, a height h of from about 24 to about 36 inches, and a depth d of from about 20 to about 30 inches.

In accordance with this invention, the bottom 58 of the container 46 has a configuration that is complementary in shape to the recesses 26*a* and 26*b* in the base 12, so that this bottom, when the container is seated on the base, is nested in the recesses. In this first embodiment, the container 46 is a unitary structure, having a box-like shape with a central, longitudinal, narrow indentation 48 on its inboard side 46*a* that receives the partition wall 14*a* when the container 46 is seated on the base 12. The indentation 48 is only slightly greater in size than the partition wall 14*a*, so this wall fits snugly within the indentation. Another central, longitudinal, narrow indentation 48*a* in the container's outboard side 46*d* opposite the indentation 48 has a liquid level gage 49 including a transparent tube 49*a* mounted therein that the technician uses to check the amount of fluid in the container 46. There are two separate fluid holding sections 46*b* and 46*c* in communication with each other via a passageway section 46*d* formed between the indentations 48 and 48*a* and extending between these two fluid holding sections. On the top of the container 46 is a pair of access ports 50 with caps 52 threaded thereon and spouts 54 with removable plugs 56 therein.

In accordance with this invention, the container 46 and the entire housing 10, or at least some of its major elements such as the cover 18, or pedestal 14, or base 12, are the same color as the container. It is likely that at a service center there will be several different types of fluid transfer machines, each having a special fluid to be used exclusively with one machine. The fluid for each of these different machines is held in its own individual container that has the same identical color as the machine in which this fluid is to be used. This avoids mistakenly using the wrong fluid, because the technician will know that the correct fluid is in a container that is the same color as the machine in which it is to be used. In the example illustrated, the fluid in the container 46 is fuel injection cleaner that is recycled many times, rather than a situation where used fluid is being replaced with new fluid. When used fluid is to be replaced with new fluid, the second embodiment of this invention is employed.

The housing components such as the platform 16, pedestal 14 and base 12 are preferably manufactured using conventional rotational molding techniques to provide an integral, unitary structure. The cover 18 is a separately manufactured component that is attached to the integral structure comprising the platform 16, pedestal 14 and base 12. When ever possible, the housing's components are made of a plastic such as high-density polyethylene or polypropylene that make the housing durable. The overall height of the housing 10 is from about 36 to about 48 inches, its overall width is from about 30 to about 40 inches, and its overall depth is from about 28 to about 40 inches. The platform 16 and tray 28 are at about waist height of the technician, i.e., from about 28 to about 36 inches above ground.

Second Embodiment

Figure 8:
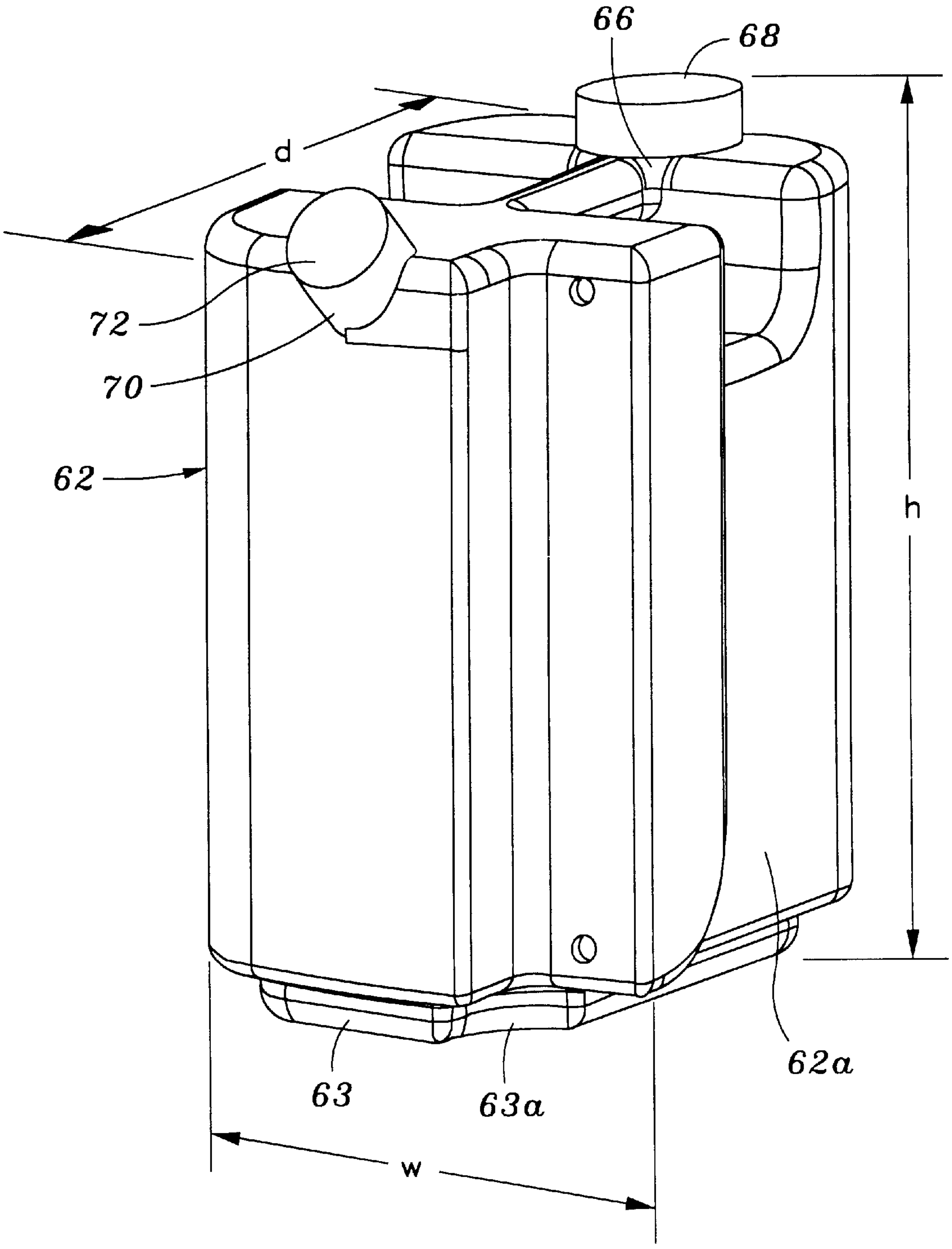
FIG. 8 is a perspective view of the "left hand" container when looking at the housing shown in FIG. 5.
Figure 9:
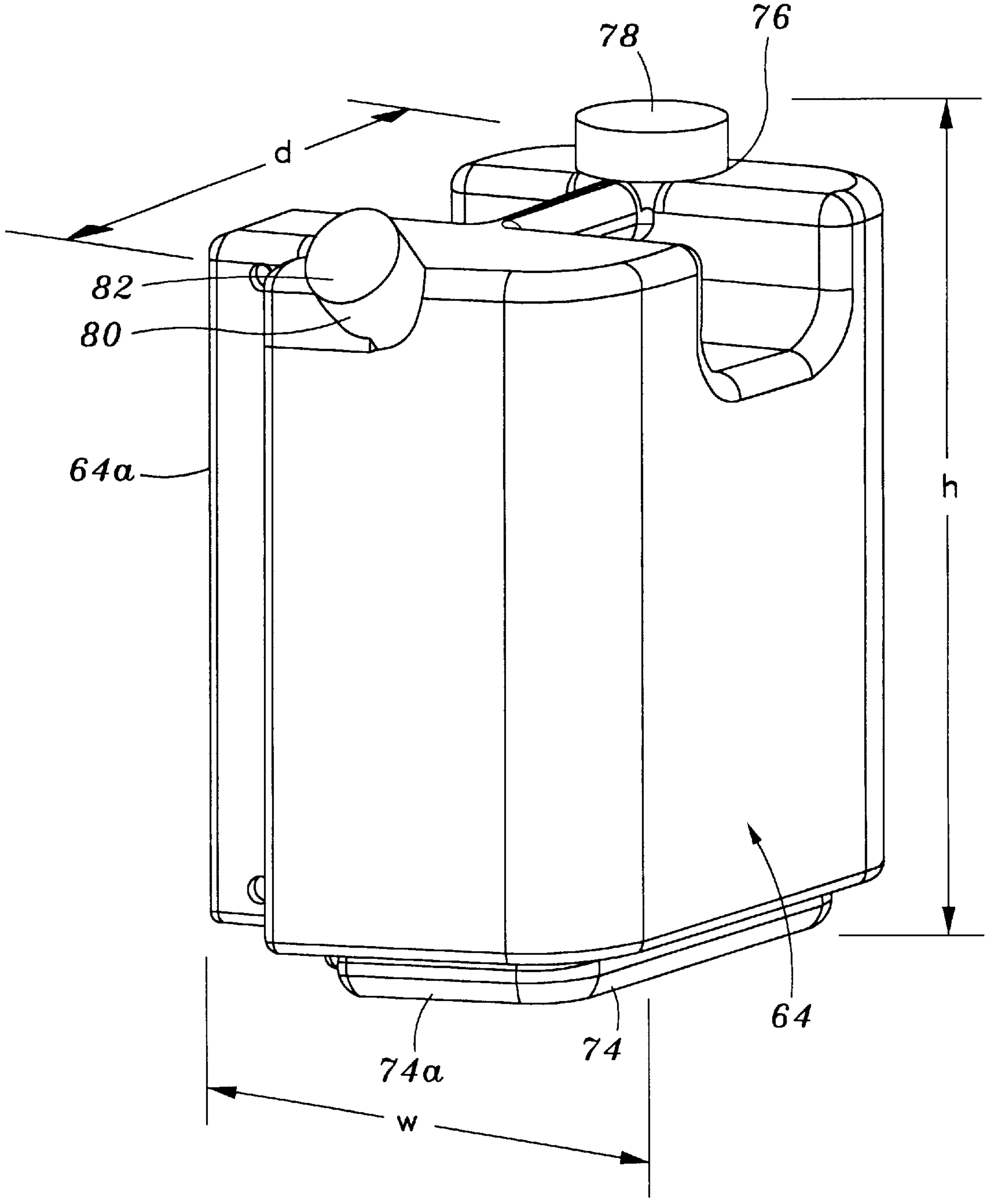
FIG. 9 is a perspective view of the "right hand" container when looking at the housing shown in FIG. 5.

As shown in FIGS. 4 through 9, the second embodiment of this invention, the housing 60, is substantially identical to that of housing 10, except in this second embodiment, two of separate containers 62 and 64 are used. As shown in FIGS. 8 and 9, these containers 62 and 64 are mirror images of each other. A minor difference between the first and second embodiments is that the edge 12*a* only extends over the central portion of the base 12 in forming the recesses 26*a* and 26*b*. These recesses 26*a* and 26*b* may be formed in many ways. What is important is that in this second embodiment, each separately supports one of the two containers 62 and 64. In this second embodiment, the housing 60 is a component of a fluid transfer machine that exchanges a used fluid with a new fluid. For example, the fluid in the container 62 is new transmission fluid that is red in color, and the container 64 will initially be empty and used to collect and store the used transmission fluid being removed from the vehicle being serviced. The housing 60 and the containers 62 and 64 will all be the same color, preferably red since the transmission fluid is red. Thus, except for color, the same major elements (covers, platforms, pedestals, and bases) of each of the housings 10 and 60 are identical. Significant costs saving are consequently realized in the manufacture of this invention.

Figure 5:
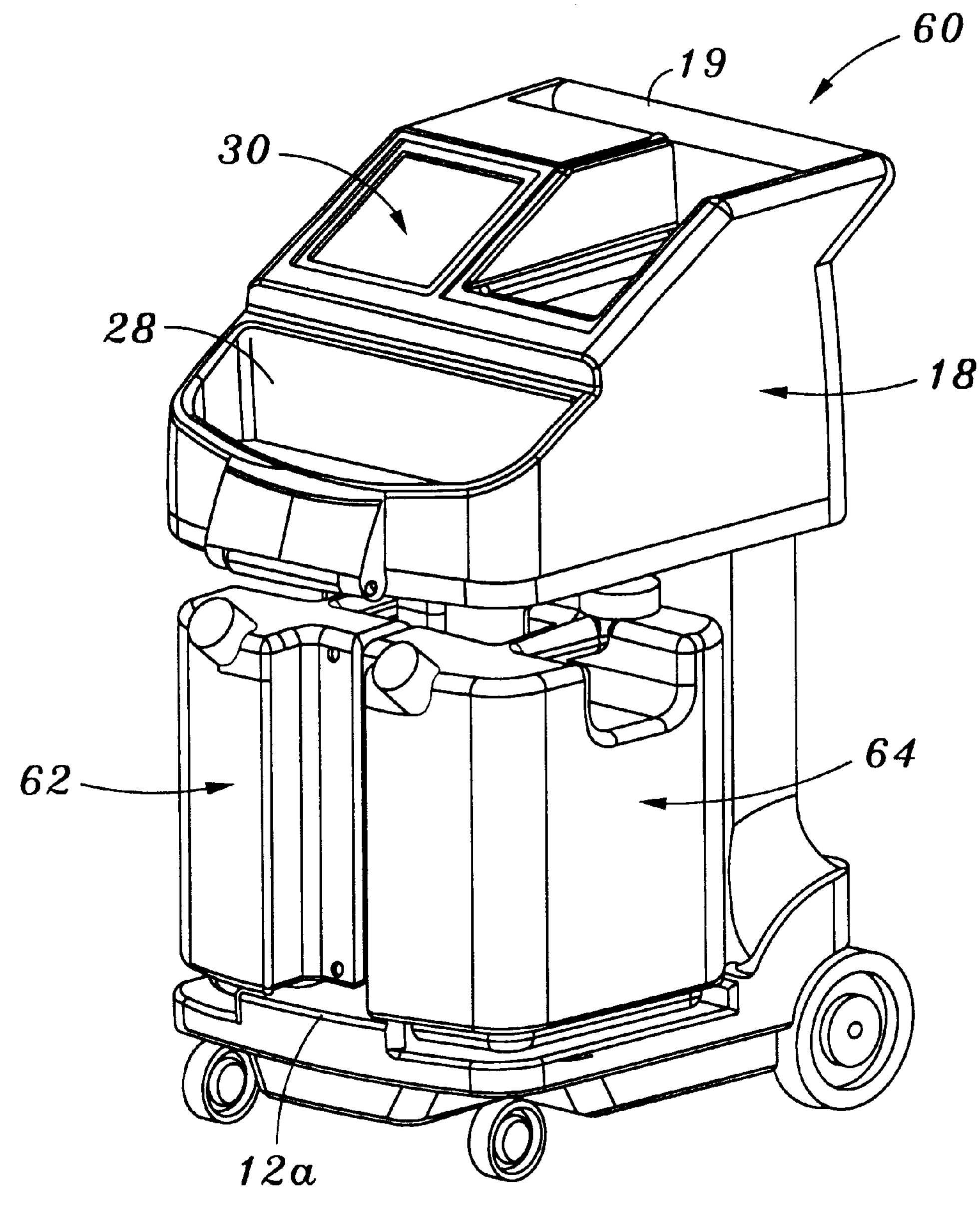
FIG. 5 is a perspective view of the housing of FIG. 4 with its containers placed in the storage space provided by the housing.
Figure 6:
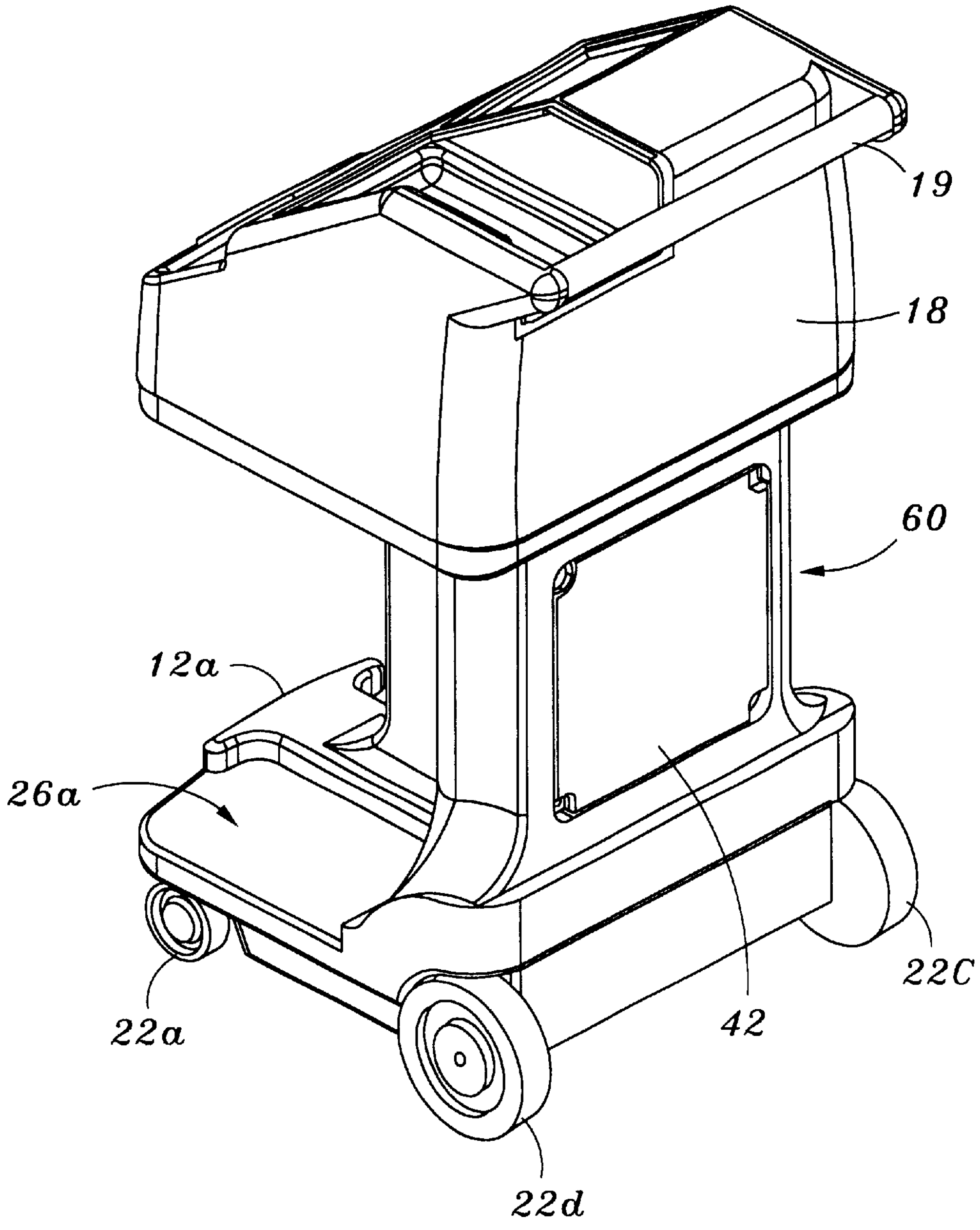
FIG. 6 is a perspective view of the housing of FIG. 4 looking at the rear of the housing.
Figure 7:
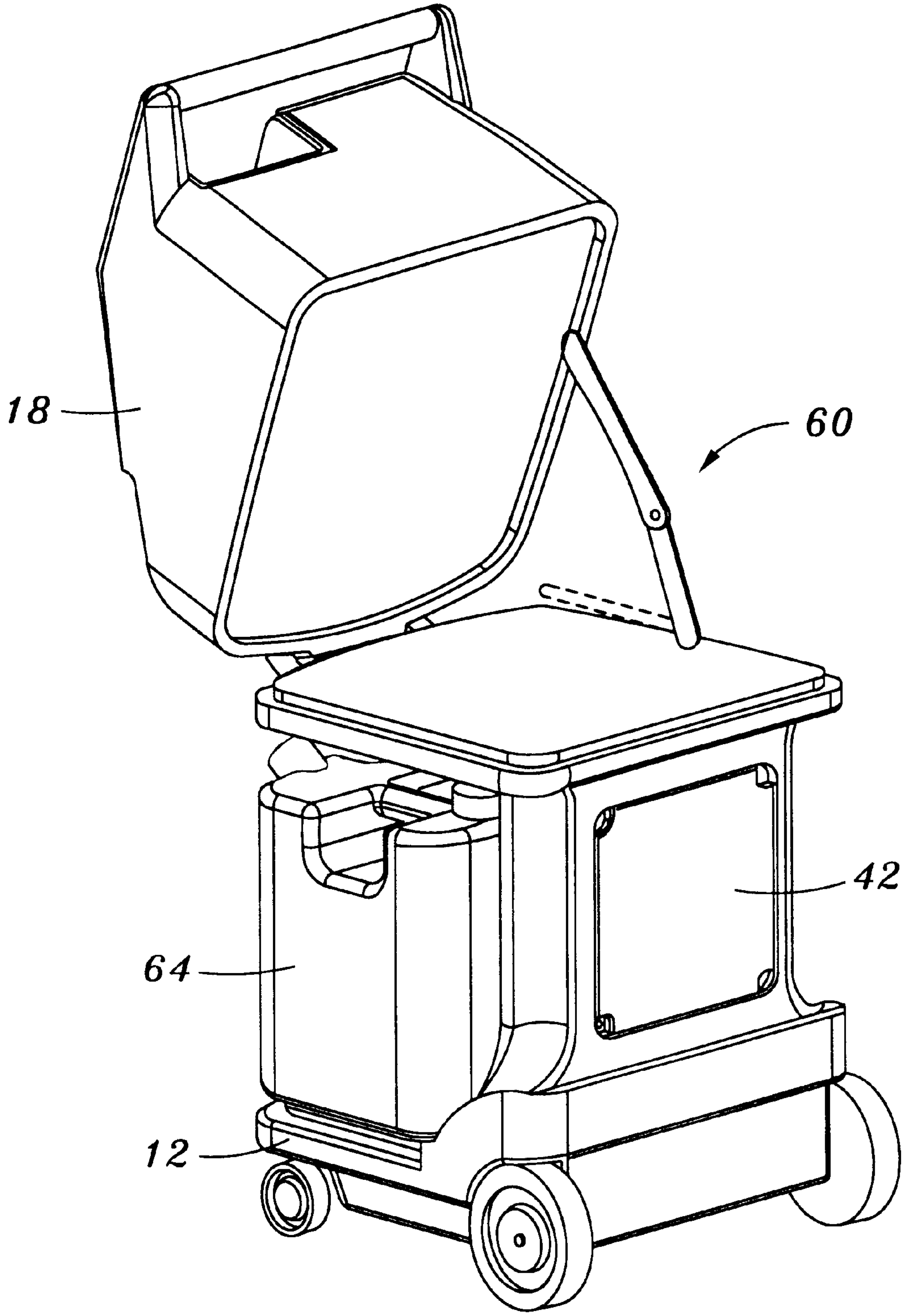
FIG. 7 is a perspective view of the housing of FIG. 6 with the cover raised.

As shown in FIG. 8, the container 62 is a "left hand" container when looking at the housing 60 as shown in FIG. 5. It has a bottom 63 with a set back perimeter 63*a* that has essentially the same configuration as the perimeter of the recess 26*a*, and thus nests within this recess as shown in FIG. 5. The height h and the depth d of the container 62 are about equal to that of the space 44, and its width w is about half that of the space 44. Thus, the container 62 fills about half the volume of the space 44 when supported by the base 12 as shown in FIG. 5. As shown in FIG. 5, the container 62 is to the left of the partition wall 14*a* and has its side wall 62*a* abutting one side of the partition wall 14*a*. On the top of the container 62 is a port 66 covered by a threaded cap 68 and a spout 70 with a plug 72 in its mouth.

As shown in FIG. 9, the container 64 is a "right hand" container when looking at the housing 60 as shown in FIG. 5. It has a bottom 74 with a set back perimeter 74*a* that has essentially the same configuration as the perimeter of the recess 26*b*, and thus nests within this recess as shown in FIG. 5. The height h and the depth d of the container 64 are about equal to that of the space 44, and its width w is about half that of the space 44. Thus, the container 64 fills about half the volume of the space 44. When supported by the base 12 as shown in FIG. 5, the container 64 fills about have the volume of the space 44 that is opposite the other container 62. The container 64 is to the right of the partition wall 14*a* and has its side wall 64*a* abutting the other side of the partition wall 14*a*. On the top of the container 64 is a port 76 covered by a threaded cap 78 and a spout 80 with a plug 82 in its mouth.

Third Embodiment

Figure 10:
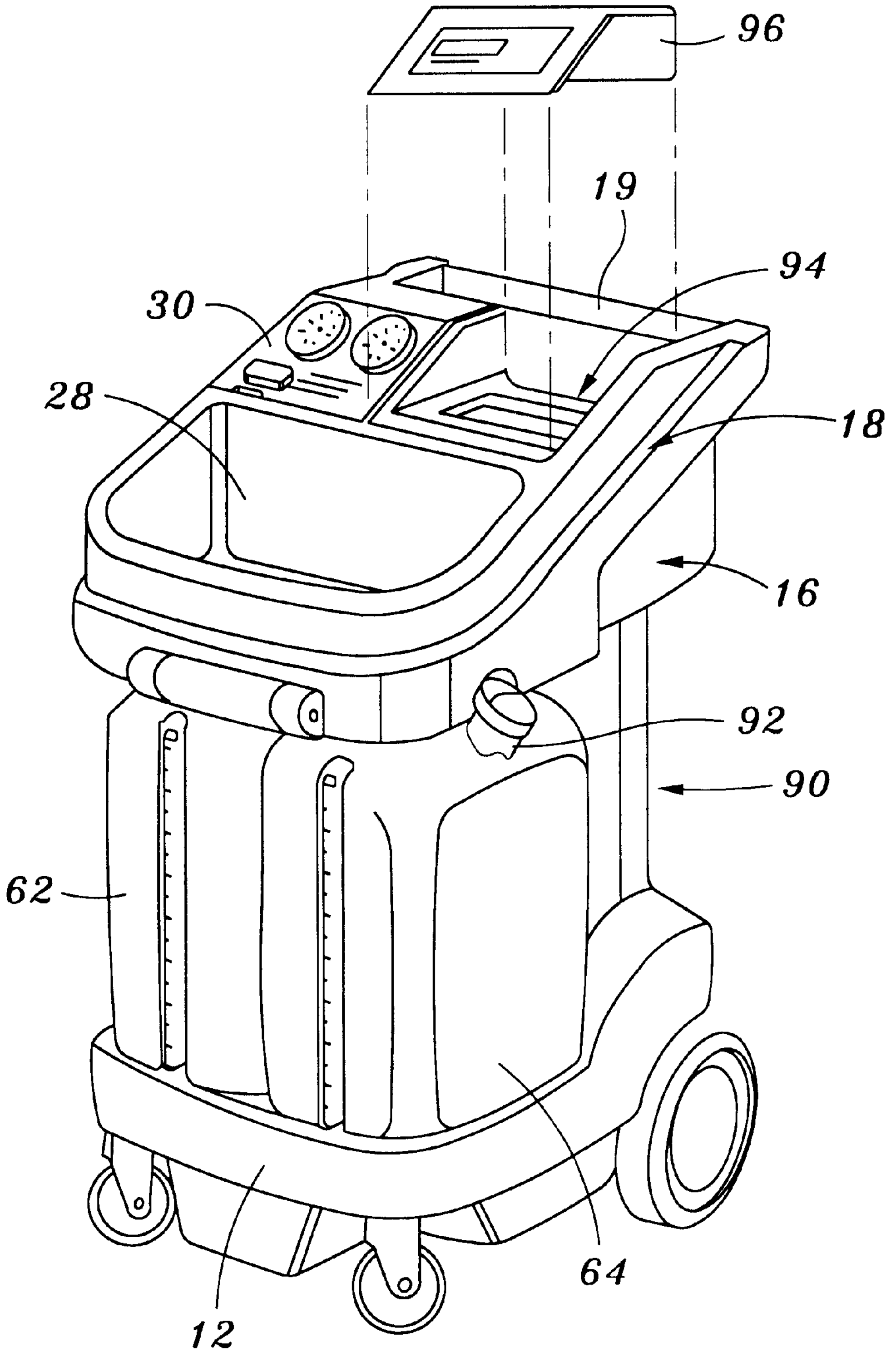
FIG. 10 is a perspective, partially exploded, view of the third embodiment of the housing this invention for a fluid transfer machine looking at the front of the housing with its containers placed in the storage space provided by the housing.

As shown in FIG. 10, the third embodiment of this invention, the housing 90, is similar in many aspects to housing 60, except in this third embodiment, the spouts 92 (only one shown) of the containers 62 and 64 are on lateral as opposed to the fronts of the containers. Also, the cover 18 has an open section 94 into which additional instrumentation may be mounted and covered by a supplement panel 96.

Fourth Embodiment

Figure 11:
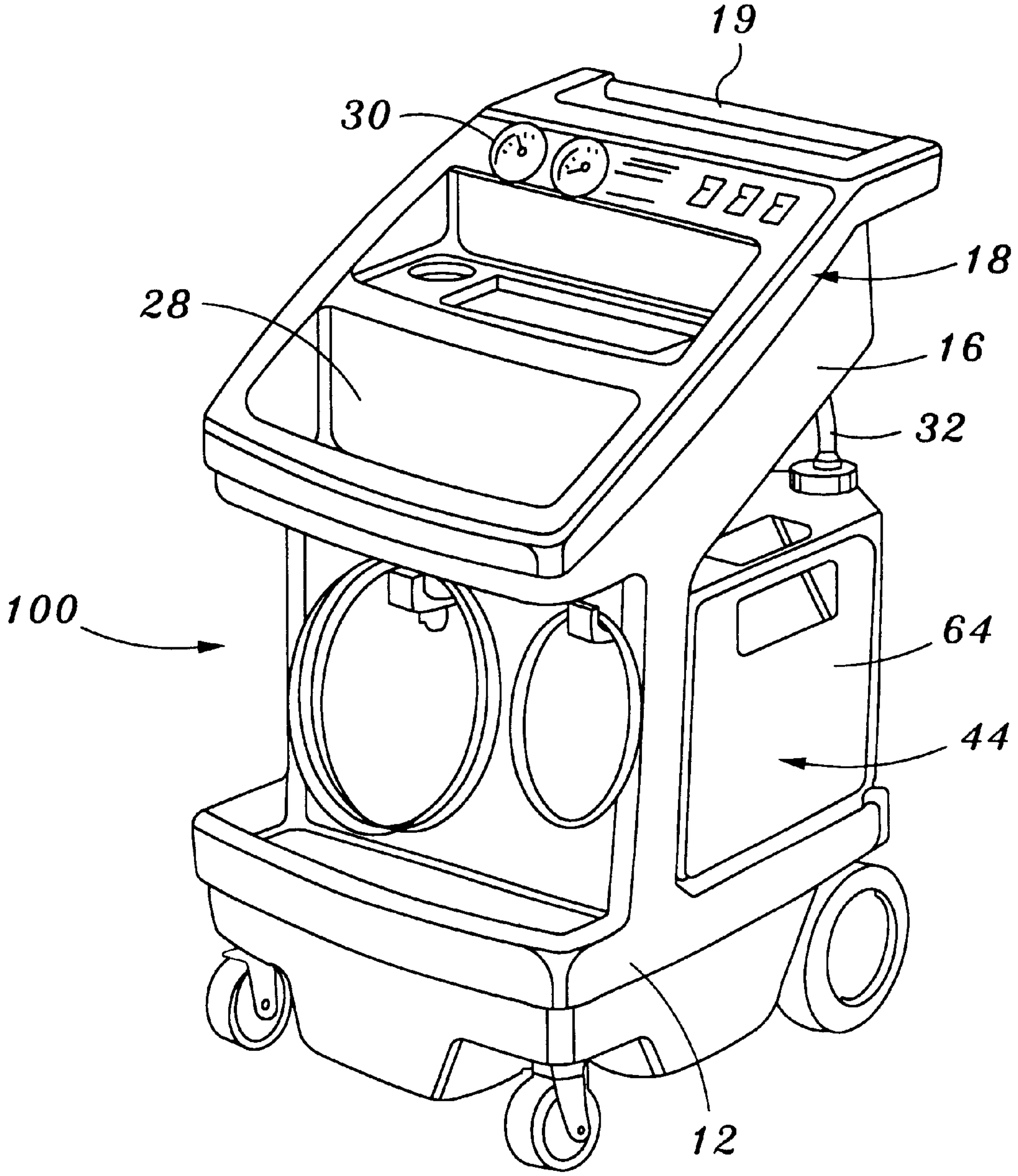
FIG. 11 is a perspective view of the fourth embodiment of the housing this invention for a fluid transfer machine looking at the front of the housing with its containers placed in the storage space provided by the housing.

As shown in FIG. 11, the fourth embodiment of this invention, the housing 100, is similar in many aspects to the above embodiments of housing of this invention, except in this forth embodiment, the platform 16 is not horizontally oriented, the cover 18 is not hinged, but may still be removed, and the space 44 is at the rear of the housing rather than at the front of the housing as depicted in the above embodiments.

Fifth Embodiment

As shown in FIGS. 12 and 13, the fifth embodiment of this invention, the housing 110, is similar in many aspects to the above embodiments of housing of this invention, except in this fifth embodiment, the space 44 is greater in volume than the volume occupied by the containers 62 and 64. This space 44 is up to a maximum of about 15 volume percent greater in volume than that occupied by the containers 62 and 64. This is best illustrated in FIG. 13. As depicted, an extra space **44*a* is created between the back walls 112 (only one shown) of the containers 62 and 64 and a front wall 114 of the pedestal rear compartment 14*b* when the bottoms 63 and 74 of the containers are nested respectively in the recesses 26*a* and 26*b*. On the front wall is a hook 120 holding a hose 122. As shown in FIG. 12, with the one container 64 removed from the space 44, a level sensing device 116 is exposed. This device 116 is inserted into the open port 76 of the container 64 upon removal of the cap 78 and placement of this container in the position next to the other container 62**.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A housing for a fluid transfer machine, including a base member having a perimeter defined by an edge, a pedestal member extending outward from the base member in a substantially vertical orientation and terminating in a platform, said pedestal member being offset inward from the edge of the base member to provide an open space beneath the platform between an underside of the platform and a topside of the base member, said space adapted to store at least one container for a fluid, and a cover member mounted to enable the cover member to move between an open position where the platform is exposed and a closed position where the platform is covered.

2. The housing of claim 1 where the pedestal member has a hollow interior and has a removable door to provide access to said hollow interior.

3. The housing of claim 1 where the pedestal member has a side nearby a portion of the edge, and opposite said side, a substantially vertical partition wall that is centrally positioned on the base member.

4. A housing for a fluid transfer machine, including a base member having a perimeter defined by an edge, a pedestal member extending outward from the base member in a substantially vertical orientation and terminating in a platform, said pedestal member being offset inward from the edge of the base member to provide an open space beneath the platform between an underside of the platform and a topside of the base member, said space adapted to store at least one container for a fluid, and a cover member mounted to enable the cover member to move between an open position where the platform is exposed and a closed position where the platform is covered, where the pedestal member has a side nearby a portion of the edge, and opposite said side, a substantially vertical partition wall that is centrally positioned on the base member, there is a pair of containers supported by the base member, with the partition wall between said containers.

5. The housing of claim 4 including a container having an opening and a level sensing instrument is inserted into said opening.

6. The housing of claim 4 where the platform is substantially horizontally oriented.

7. The housing of claim 4 including at least one hose member in communication with a container in said space.

8. The housing of claim 7 where the hose member extends from the underside of the platform and terminates in a connector adapted to attach and detach the hose member to the container.

9. The housing of claim 4 including a container having a bottom with a predetermined configuration and the topside of the base member has a recess portion therein that is substantially identical to said predetermined configuration of the bottom of the container to facilitate storing the container in said space.

10. The housing of claim 4 including a container and there is a predetermined distance between the underside of the platform and the topside of the base member, and the container has a height substantially the same as said predetermined distance.

11. The housing of claim 10 where said predetermined distance is from 24 to 36 inches.

12. The housing of claim 4 where the platform and the base member have substantially the same over all shape and dimensions.

13. The housing of claim 4 where the cover member is attached by a hinge member to the platform.

14. The housing of claim 4 including a container and said container and at least a part, or component of the housing, of substantially the same color.

15. The housing of claim 4 including wheel members extending from an underside of the base member.

16. The housing of claim 4 including a container and the space has a volume that is complementary to the shape and dimensions of the container.

17. The housing of claim 16 where the container occupies essentially the entire space when the container positioned on the base member.

18. The housing of claim 16 where the pedestal member has a partition wall.

19. A housing for a fluid transfer machine, including a base member having a perimeter defined by an edge, a pedestal member extending outward from the base member in a substantially vertical orientation and terminating in a platform, said pedestal member being offset inward from the edge of the base member to provide an open space beneath the platform between an underside of the platform and a topside of the base member, said space adapted to store at least one container for a fluid, and a cover member mounted to enable the cover member to move between an open position where the platform is exposed and a closed position where the platform is covered, a container and the space has a volume that is complementary to the shape and dimensions of the container, where the pedestal member has a partition wall, the container is a unitary structure having a central, longitudinal, narrow indentation on an inboard side thereof that receives the partition wall when the container is positioned on the base member.

20. The housing of claim 19 where the indentation is only slightly greater in size than the partition wall, so said wall fits snugly within the indentation.

21. The housing of claim 19 including a container having a predetermined height and a predetermined volume and the space has a height that is substantially the same as the predetermined height of the container and the space is greater in volume than the predetermined volume of the container.

22. The housing of claim 21 the space is up to a maximum of 15 volume percent greater than the predetermined volume of the container.

23. A housing for a fluid transfer machine, including a base member with wheel members extending from an underside of the base member, said base member having a perimeter defined by an edge, a pedestal member having a hollow interior, said pedestal member extending outward from the base in a substantially vertical orientation and terminating in a platform in a substantially horizontal orientation, said pedestal member being offset inward from the edge of the base member to provide an open space beneath the platform between an underside of the platform and a topside of the base member for storing a pair of containers for a fluid, said platform and base member having substantially the same over all shape and dimensions and the underside of the platform and the topside of the base member being separated by a predetermined distance, said pedestal member having a substantially vertical partition wall that is centrally positioned on the base member, said vertical partition wall having an edge offset inward from the edge of the base member, a cover member attached by a hinge member to the platform to enable the cover member to move between an open position where the platform is exposed and a closed position where the platform is covered, and a pair of containers for a fluid, said containers being manually movable into and from the space and being supported by the topside of the base member, with the partition wall between said containers when said container are positioned in said space, each container having substantially the same height which is slightly less than said predetermined distance.

24. The housing of claim 23 where the pedestal member has a removable door to provide access to said hollow interior.

25. The housing of claim 23 where at least one container includes a opening and a level sensing instrument is inserted into said opening.

26. The housing of claim 23 including at least one hose member that extends from the underside of the platform and terminates in a connector for attaching and detaching the hose member to at least one of the containers.

27. The housing of claim 23 where as said predetermined distance is from 24 to 36 inches.

28. The housing of claim 23 where the topside of the base member has a pair of recess portions therein, with each container being seated in one recess portion.

29. The housing of claim 28 where the each recess portion is substantially identical to a predetermined configuration of the bottom of the container seated therein.

30. The housing of claim 23 where the containers are mirror images of each other.

31. A housing for a fluid transfer machine, including a base member having a substantially rectangular perimeter defined by an edge, said edge having a front edge portion and a rear edge portion opposite said front edge portion, a pedestal member extending outward from the base in a substantially vertical orientation and terminating in a substantially rectangular platform in a substantially horizontal orientation, said platform and base member having substantially the same over all shape and dimensions, said pedestal member being offset inward from the front edge portion to provide an open space beneath the platform between an underside of the platform and a topside of the base member, said space adapted to store a pair of containers for fluid when positioned in said space side by side next to each other, said pedestal member having a first side nearby the rear edge portion and a substantially vertical partition wall centrally positioned on the base member at substantially at a right angle to the rear edge portion, said vertical partition wall having an edge offset inward from the front edge portion, a cover member attached by a hinge member to the platform to enable the cover member to move between an open position where the platform is exposed and a closed position where the platform is covered, and a pair of containers for fluid, each container being manually movable into and from the space and being supported by the topside of the base member, with the partition wall between said containers when in said space side by side next to each other, each container having a bottom with a predetermined configuration and the topside of the base member having a pair of recess portions therein next to each other into which one container of said pair is seated, each recess portion being substantially identical to the predetermined configuration of the bottoms of the container seated therein, and each container having substantially the same height which is slightly less than as said predetermined distance.

32. The housing of claim 31 including wheel members extending from an underside of the base member.

33. The housing of claim 31 where the pedestal member has a hollow interior.

34. A method of transferring fluid between a container of fluid and an automotive vehicle including the steps of (a) providing a transfer machine having a housing, including a base member having a perimeter defined by an edge, a pedestal member extending outward from the base member in a substantially vertical orientation and terminating in platform, said pedestal member being offset inward from the edge of the base member to provide an open space beneath the platform between an underside of the platform and a topside of the base member for storing at least one container for a fluid, and a cover member mounted to enable the cover member to move between an open position where the platform is exposed and a closed position where the platform is covered;

(b) placing a container of fluid into the open space with said container being supported by the topside of the base member; and (c) placing the container and the automotive vehicle in communication with each other through the transfer machine to effect a transfer of the fluid in the container until substantially of the fluid is removed from the container and the container is empty.

35. The method of claim 34 including the step of replacing with a new container of fluid the empty container.

36. The method of claim 34 where a pair of containers are employed, one for new fluid and the other for used fluid.

37. The method of claim 34 where the housing, or a portion thereof, and the container have substantially the same color.

38. A housing for a fluid transfer machine, including a base member having a perimeter defined by an edge, a pedestal member extending outward from the base member in a substantially vertical orientation and terminating in a platform, said pedestal member having a side that is offset inward from the edge of the base member to provide an open space beneath the platform between an underside of the platform and a topside of the base member, a substantially vertical partition wall that is centrally positioned relative to the base member and adjacent said side of the pedestal to form a pair of recesses in said open space, each recess adapted to hold a container supported by the base member, with the partition wall between containers supported thereon, and a cover member mounted to enable the cover member to move between an open position where the platform is exposed and a closed position where the platform is covered.

39. A housing for a fluid transfer machine, including a base member having a perimeter defined by an edge, a pedestal member extending outward from the base member in a substantially vertical orientation and terminating in a platform, said pedestal member (a) being offset inward from the edge of the base member to provide an open space beneath the platform between an underside of the platform and a topside of the base member that is sized to hold one or more removable containers, (b) having a hollow interior, and (c) a door that provides access to said hollow interior, and a cover member mounted to enable the cover member to move between an open position where the platform is exposed and a closed position where the platform is covered.

40. A housing for a fluid transfer machine used with a container of a predetermined shape and dimensions, including a base member having a perimeter defined by an edge, a pedestal member extending outward from the base member in a substantially vertical orientation and terminating in a substantially platform in a substantially horizontal orientation, said pedestal member being offset inward from the edge of the base member to provide an open space beneath the platform between an underside of the platform and a topside of the base member, said space having a volume that is complementary to said predetermined shape and dimensions of the container, so that said container occupies essentially the entire space when the container positioned on the base member, and a cover member mounted to enable the cover member to move between an open position where the platform is exposed and a closed position where the platform is covered.

41. The housing of claim 40 where the topside of the base member has a recess portion therein that is substantially identical to a predetermined configuration of the bottom of the container adapted to be placed thereon to facilitate storing the container in said space.

* * * * *

UNITED STATES PATENT AND TRADEMARK OFFICE

CERTIFICATE OF CORRECTION

PATENT NO. : 6,698,472 B2
DATED : March 02, 2004
INVENTOR(S) : Camacho et al.

It is certified that error appears in the above-identified patent and that said Letters Patent is hereby corrected as shown below:

Column 11,
Line 27, between the words "substantially" and "of" insert the word -- all --.

Signed and Sealed this

Thirteenth Day of July, 2004

JON W. DUDAS
*Acting Director of the United States Patent and Trademark Office*